United States Patent [19]

Ohba

[11] 4,322,667

[45] Mar. 30, 1982

[54] DC MACHINE CONTROL CIRCUIT

[76] Inventor: Shunjiro Ohba, 5969 N. Elston Ave., Chicago, Ill. 60646

[21] Appl. No.: 67,314

[22] Filed: Aug. 17, 1979

[51] Int. Cl.$^3$ ............................................. H02P 5/16
[52] U.S. Cl. .................................. 318/338; 318/139; 318/341; 318/493
[58] Field of Search ................ 318/139, 341, 338, 493

[56] References Cited

U.S. PATENT DOCUMENTS

| | | | |
|---|---|---|---|
| 3,328,746 | 4/1968 | Weiser | 318/338 |
| 3,735,220 | 5/1973 | Renner et al. | 318/139 |
| 3,841,238 | 10/1974 | Thompson et al. | 318/341 |
| 3,962,612 | 6/1976 | Kawasaki | 318/139 |
| 4,037,144 | 7/1977 | Ohmae et al. | 318/493 |
| 4,052,647 | 10/1977 | Thompson | 318/139 |
| 4,114,076 | 9/1978 | Teranishi et al. | 318/139 |
| 4,188,569 | 2/1980 | Campbell | 318/139 |

FOREIGN PATENT DOCUMENTS

WO79/355 6/1979 World Intel. Prop. Org. .

*Primary Examiner*—David Smith, Jr.
*Attorney, Agent, or Firm*—Trexler, Bushnell & Wolters, Ltd.

[57] ABSTRACT

A control system for automatically controlling the coefficient of excitation of a DC machine comprises, in general, generator means for generating a pulse signal having a predetermined frequency and pulse width. Demand signal means are utilized for producing an electrical demand signal corresponding to the demand on the DC machine. Armature current sensing means are coupled to the armature winding for producing an electrical drive signal corresponding to the armature current in the DC machine. Control circuit means are coupled to the generator means and are responsive to the demand signal and the drive signal for adjusting the pulse width of the pulse signal. Means are coupled between the control circuit means and the armature and field winding and are responsive to the pulse signal for applying signals to the armature and field windings which vary in accordance with the adjusted pulse width, whereby the coefficient of field excitation is varied in accordance with the corresponding demand and armature current to substantially increase the efficiency of the DC machine.

10 Claims, 17 Drawing Figures

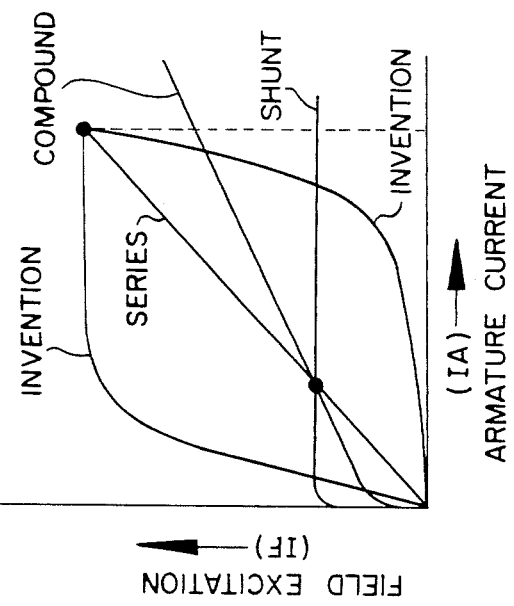
FIG. 11
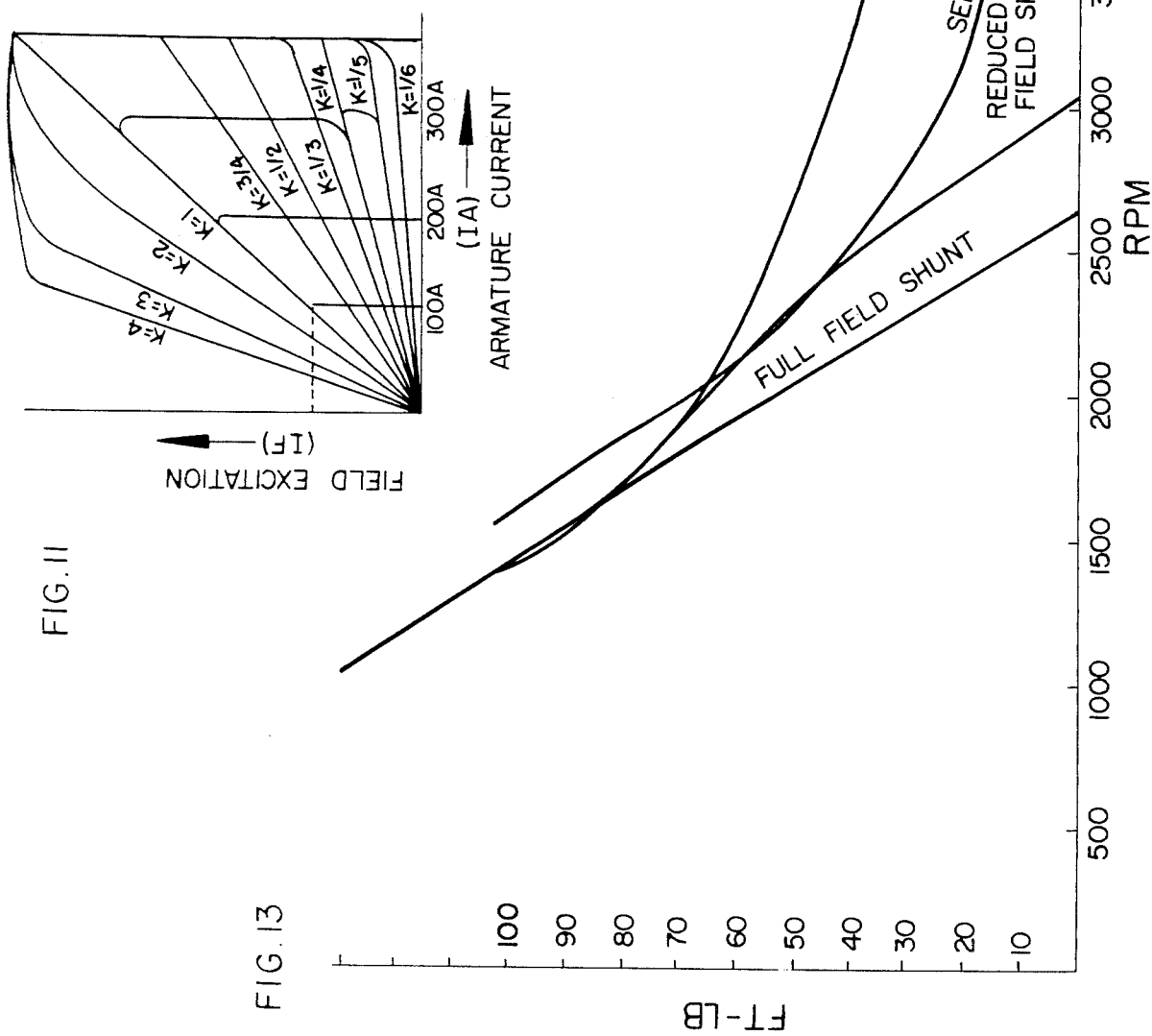
FIG. 12
FIG. 13

DC MACHINE CONTROL CIRCUIT

BACKGROUND OF THE INVENTION

This invention generally relates to a new and improved control circuit for DC machines and, more particularly, relates to such a circuit which is well suited for use with an electric motor used to propel a vehicle such as an automobile.

DC motors are widely used as traction motors for various types of vehicles because of the relative simplicity of operation and ability to provide a high torque. A DC motor having its field winding in series with its armature winding (a "series-wound" motor) provides high torque at low rpm but its power output decreases substantially at high rpm. A DC motor having its field winding in parallel with its armature winding (a "parallel-wound" or "shunt-wound" DC motor) can be designed to provide high power output at higher rpm but only within a rather narrow range of rpm, outside of which range power and/or efficiency decrease significantly. This range of rpm for optimum efficiency can be relocated about different rpm values by well-known techniques. For many applications, such as electric automobiles, however, the amount of output power for such conventional motors is significantly limited at the higher cruising or passing speeds if the motor is designed to achieve optimum efficiency at medium speeds such as those used in city driving, and vice versa.

Attempts to at least partially solve this problem include "field weakening", employing a compound-wound motor, or utilizing a separately-excited shunt motor. None of these techniques has solved the problem to the fullest.

The ratio of field current or excitation to armature current in a DC machine is referred to as the coefficient of field excitation and is commonly designated as "k". In a separately-excited shunt-wound motor, field excitation is independent of the armature current; hence, k equals zero. In a series-wound motor, the field current and armature current are the same; thus, k equals unity. For a compound-wound motor, a part of the field excitation can be varied independently of the armature current so that the k coefficient can vary between zero and one.

In general, for a particular rpm, the coefficient k can be optimized for maximum motor efficiency. The problem is that the optimum value of k differs as the rpm differs. Consequently, DC motors are generally optimized for a particular rpm at or near which the motor will operate for the intended application. In a shunt-wound motor, for example, the peak performance is obtained only in a very narrow range where the armature back EMF becomes slightly (i.e., 5-15%) lower than the input voltage. In a series-wound motor, the maximum efficiency is reached at a given input voltage and rpm under a given torque load. In order to increase rpm, load torque has to be reduced, as a result of which the back EMF prevents further energy from being accepted by the armature.

The peak operating range of a series-wound motor can be expanded somewhat by a technique known as "field weakening" wherein a resistance is placed in parallel with the field winding so that a part of the armature current that would otherwise pass through the field is by-passed around the field, thereby reducing the amount of back EMF generated by the armature. A compound-wound motor has a field excitation, a part of which is independent of armature current and another part of which is directly related to the armature current which varies with the load torque applied to the motor. The shunt portion of the field can of course be reduced or even turned off completely to effect field weakening so that the motor has two ranges wherein its efficiency may be peaked.

It is therefore a general object of the invention to provide a new and improved control circuit for DC machines.

A more specific object is to provide a new and improved control system for a DC machine which substantially widens the range of optimum efficiency of operation of the DC machine.

A more specific object is to provide a new and improved control circuit, in accordance with the foregoing object, for a DC motor which substantially expands the power band of the motor.

A related object is to provide a control system in accordance with the foregoing object which also substantially increases the maximum power acceptance of a DC motor.

It is another object of the invention to provide such a new and improved control circuit which is particularly well suited for use in a vehicle such as an automobile.

SUMMARY OF THE INVENTION

In accordance with the invention, a control system for automatically controlling the coefficient of excitation of a DC machine comprises, in general, generator means for generating a pulse signal having a predetermined frequency and pulse width. Demand signal means are utilized for producing an electrical demand signal corresponding to the demand on the DC machine. Armature current sensing means are coupled to the armature winding for producing an electrical drive signal corresponding to the armature current in the DC machine. Control circuit means are coupled to the generator means and are responsive to the demand signal and the drive signal for adjusting the pulse width of the pulse signal. Means are coupled between the control circuit means and the armature and field winding and are responsive to the pulse signal for applying signals to the armature and field windings which vary in accordance with the adjusted pulse width, whereby the coefficient of field excitation is varied in accordance with the corresponding demand and armature current to substantially increase the efficiency of the DC machine.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

FIGS. 11, 12 and 13 are graphs illustrating various aspects of the operation of the present invention;

DETAILED DESCRIPTION OF THE ILLUSTRATED EMBODIMENT

In the control system of the invention, an average armature current is produced by a pulse-width control circuit and is compared with a demand signal which is representative of the degree of accelerator advancement or depression. In a similar fashion, the average field current is determined by a pulse-width control circuit that is responsive to accelerator depression and to measured armature current.

Figure 1:
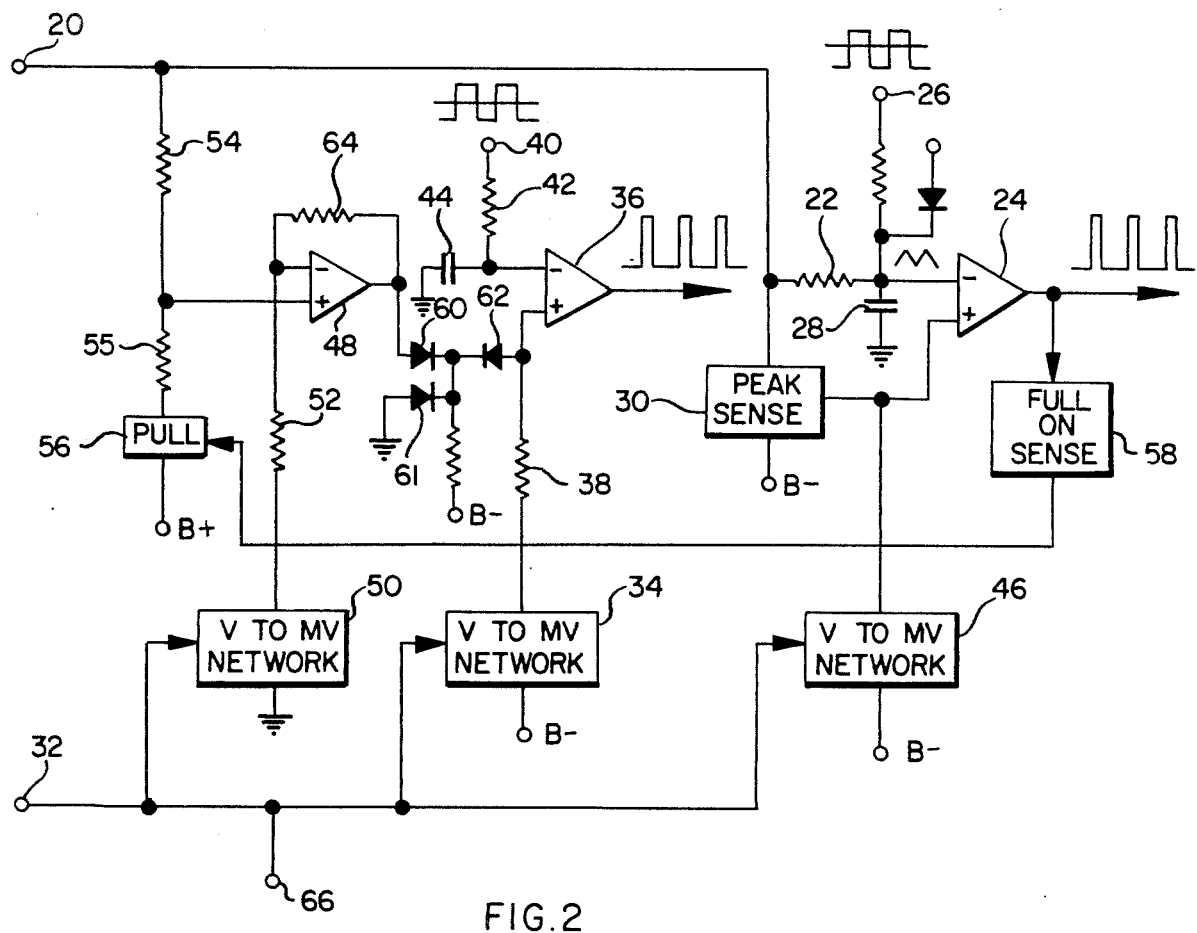
FIG. 1 is a schematic circuit diagram, partially in block diagram form, illustrating an exemplary control circuit in accordance with the invention for running a DC motor.

FIG. 1 illustrates the motor control logic according to the invention for running a DC motor. At a first input 20 there is applied a "running current" signal which corresponds to the actual armature current and is measured with a current sensor or may be derived from the emitter current signal from the output stage (see FIGS. 7-9) including the ripple signal that is present during low rpm. This signal is in the millivolt range and is applied by a resistor 22 to the inverting input of an operational amplifier 24 which is used as a voltage comparator. A maximum desired value for this signal is stored in peak sensing circuit 30 so as to limit the accelerator signal applied to comparator 24. The running current input signal to comparator 24 is modulated with a square-wave signal which is applied at a point 26, and in turn is converted to a triangular-shaped wave by capacitor 28. The square-wave signal is derived from the power supply circuit (not shown in FIG. 1, see FIG. 15).

At a second input terminal 32 in FIG. 1, there is applied an "accelerator" signal which corresponds to the degree of power demand (e.g., the amount of accelerator depression) and which is in the volt range. This signal is derived by the circuit shown in FIG. 3 and is converted to a millivolt signal by volts-to-millivolts network 34 and is then applied to the non-inverting input of operational amplifier 36 by way of a resistor 38. Op Amp 36 is operated as a comparator and compares the accelerator signal against a triangular wave signal that is applied to its inverting input. This triangular wave signal is generated from a square wave applied at a terminal 40 to a resistor 42 and capacitor 44. The level of accelerator signal determines the point on the triangular wave where the output 46 of the comparator 36 shifts from low to high; hence, it determines the width of the pulses of this output signal. This output 46 is applied to a field pulse-width controller (see FIGS. 7-9).

The accelerator signal also is applied to the non-inverting input of the comparator 24 by means of a volts-to-millivolts network 46. In a manner quite similar to comparator 36, comparator 24 thus compares the combined DC signal and triangular-shaped wave against the accelerator signal as limited by the peak sensing circuit 30. The output from comparator 24 is a pulse-width controlled signal which is used to drive the armature pulse-width controller (see FIGS. 7-9).

A third operational amplifier 48 is used to effectively switch the system from a first mode of motor control wherein the armature current is controlled to a second mode of motor control wherein the field current is controlled. The accelerator signal is applied to the inverting input of op amp 48 by means of a volts-to-millivolts network 50 and resistor 52, and the running current signal is applied to the non-inverting input of op amp 48 by a resistor 54. A resistor 55 connects the non-inverting input of op amp 48 to a "pull-up" circuit 56, which is controlled by a "full-on" sensing circuit 58. The output of op amp 48 is applied to the non-inverting input of op amp 36 by way of diodes 60 and 62. When the "full-on" sensing circuit 58 senses that the armature current is at the maximum level (i.e., the output of op amp 24 is constantly high), it applies a deactivating signal by way of the pull-up circuit 56 and takes resistor 55 out of circuit with the non-inverting input of operational amplifier 48 to permit the signal resulting from comparison of the running current signal via resistor 54 against the accelerator signal from network 50 to be applied to the non-inverting input of op amp 36. Lack of a running current signal compared against the accelerator signal is amplified as an offset signal with the gain of op amp 48 being determined by resistors 64 and 52. This offset signal is applied through isolation diodes 60 and 62 in order to reduce the pulse-width of the output signal from op amp 36, thus reducing the field excitation. This also reduces the armature back EMF which results in an increase of armature current which in turn balances the inputs to op amp 48.

Figure 7:
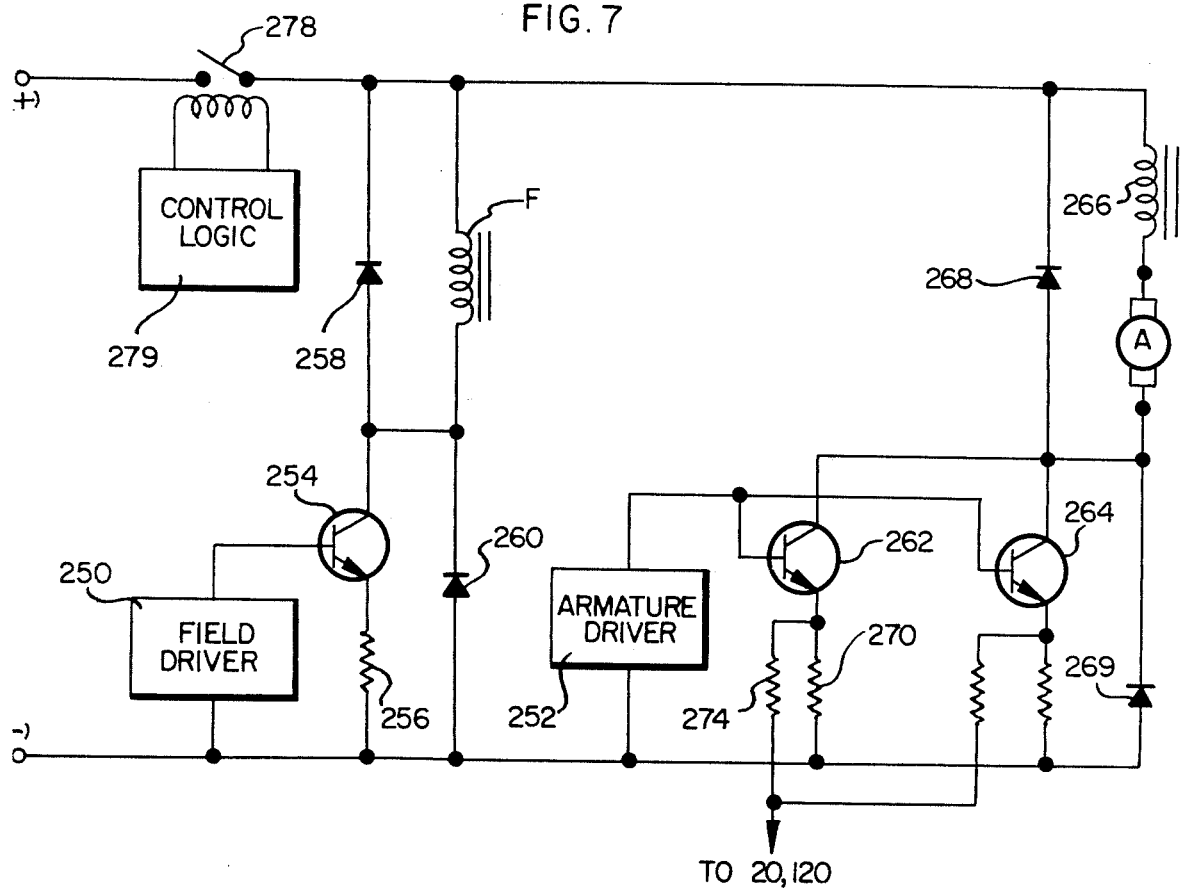
FIG. 7 is a schematic circuit diagram, partially in block diagram, of an exemplary motor power controller for running a DC motor.

In the illustrated embodiment, the logic circuit of FIG. 7 also utilizes a "low battery" signal at a terminal 66 which is combined with the accelerator signal to automatically back off the armature current (i.e., effectively defining the limit of maximum accelerator depression).

A current signal amplifier (see FIG. 9) can alternatively be employed to amplify the armature current signal from the millivolts range to the volts range, thus eliminating the need for the volt-to-millivolt networks 34, 36, 50.

Figure 2:
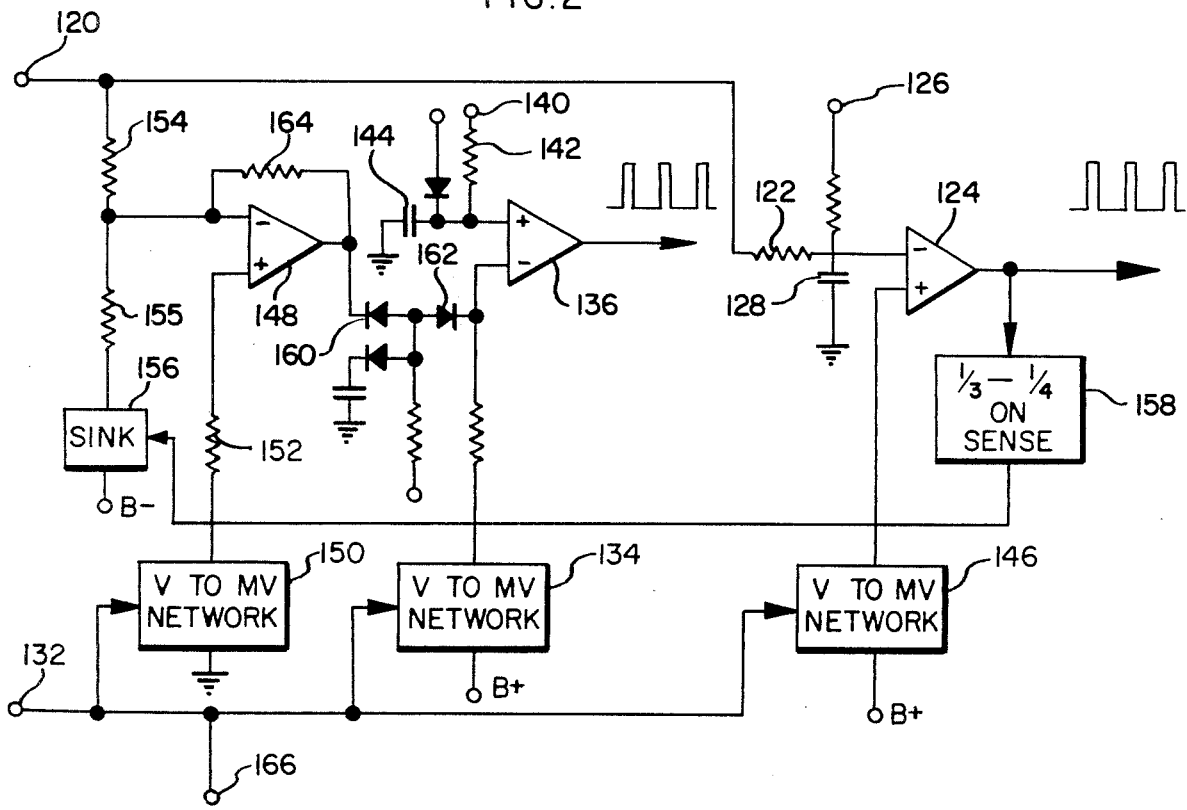
FIG. 2 is a schematic circuit diagram, partially in block diagram form, of an exemplary circuit in accordance with the invention for braking a DC motor.

Referring to FIG. 2, a control logic circuit for braking of a DC motor is illustrated. The circuit is similar to that shown for running, in FIG. 1, except that it functions essentially as a voltage multiplier, rather than as a current multiplier as does the circuit of FIG. 1. Additionally, the relative polarities of the several inputs and input signals are generally reversed in FIG. 2 (with respect to FIG. 1), in order to achieve suitable signals for braking of a DC motor. Briefly, an input 120 receives a "braking current" signal, corresponding to the armature current for braking. This signal is applied via a resistor 122 to the inverting input of an operational amplifier 124. This signal is further modified with a square wave signal at a terminal 126, converted to a triangular-shaped wave by a capacitor 128.

A braking signal input, derived from the position of the accelerator for braking, and generally of negative polarity, is fed to a second input terminal 132, and via a volts-to-millivolts conversion network 134 and resistor 138 to the inverting input of an op amp 136. Op amp 136 compares this signal against a triangular wave derived from a square wave signal applied at a terminal 140 and modified by a resistor 142 and capacitor 144. This op amp 136 feeds a control pulse width signal to the armature controller (see FIGS. 7-9).

The braking signal at terminal 132 is also applied to the non-inverting input of the comparator 124 by way of a volt-to-millivolts network 146. Op amp 124 then functions as a comparator to compare the modulated braking current signal with the braking signal, producing at its output a pulse-width controlled signal which is used to drive the field pulse width controller (see FIGS. 7-9).

A third operational amplifier 148 is generally analogous in the braking mode to the function of the op amp 48 of FIG. 1 in the running mode. The accelerator signal is applied to the non-inverting input of op amp 48 by way of a volts-to-millivolts network 50 and a resistor 52, and the braking current signals applied to the inverting input of op amp 148 by way of a resistor 154. A resistor 155 connects the inverting input of op amp 148 to a "sink" circuit 56 which is controlled by a "partially on" sensing circuit 158. The output of op amp 148 is applied to the inverting input of op amp 136 by way of diodes 160 and 162. When the "partially on" sensing circuit 158 senses a predetermined level of armature current, it applies a deactivating signal by way of the sinking circuit 156, to take resistor 155 out of circuit with the inverting input of op amp 148. In the illustrated embodiment, a "high battery" signal at a terminal 166 is combined with the braking signal, effectively defining the maximum braking level.

Figure 3:
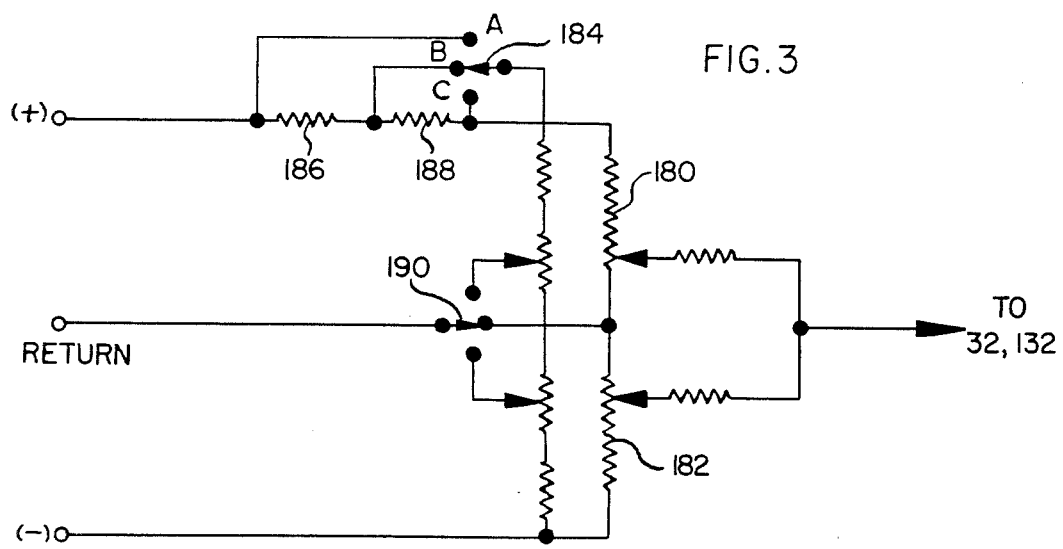
FIG. 3 is a schematic circuit diagram of an exemplary accelerator/brake arrangement which may be employed advantageously with the embodiment of the invention illustrated in FIG. 1.

FIG. 3 illustrates a circuit that may be used to provide the accelerator (and also brake) signal (at terminals 32 and 132) for the control logic circuitry of FIGS. 1 and 2. A potentiometer 180 is associated with the accelerator and potentiometer 182 is associated with the brake. A switch 184 is provided in the accelerator branch of the circuit to enable selection of the desired performance range. With switch 184 in the A position, resistors 186 and 188 are by-passed to give a "high" performance range. In the B position, switch 184 bypasses only resistor 188 and the system is in a "medium" range, whereas with switch 184 in the C position, resistors 186 and 188 are both in the circuit which provides a "low" range. A switch 190 is provided as shown to permit quiescent adjustment to permit idling of the motor to keep the hydraulic pump operating when used with an automatic transmission, for example.

Figure 4:
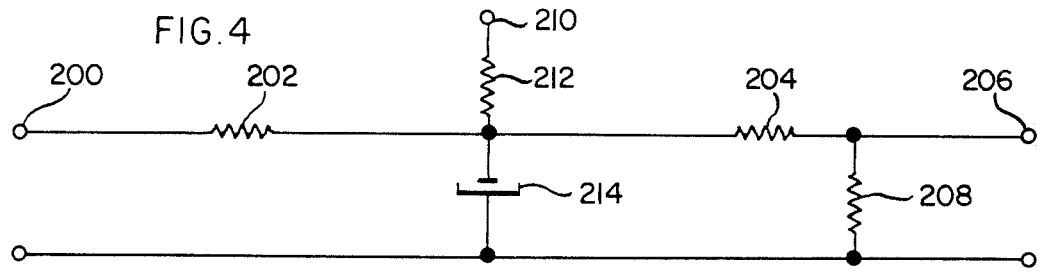
FIG. 4 is a schematic circuit diagram of an exemplary volt-to-millivolt conversion circuit which may be utilized for several of the blocks in the embodiment of FIG. 1.

FIG. 4 illustrates an exemplary volts-to-millivolts circuit, which may be used for the networks 34, 36, 50 and 134, 146, 150 of FIGS. 1 and 2. An input 200 receives the accelerator signal at points 32 or braking signal at point 132 and feeds a pair of series connected resistors 202 and 204 which in turn feed the output 206. A resistor 208 is provided between the output and the circuit ground, the values of resistors 202, 204 and 208 being chosen so as to provide suitable voltage conversion ratio. In the illustrated embodiment, provision is also made for applying reverse bias, if required to achieve the desired conversion. This comprises a reverse bias input terminal 210 joined by a resistor 212 to the junction of resistors 202 and 204. A suitable noise filter capacitor 214 is also provided between this junction and ground.

Figure 5:
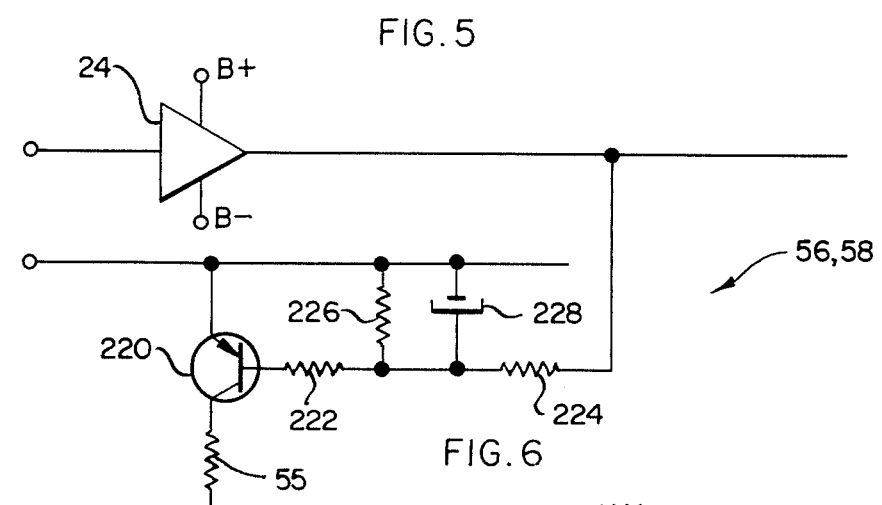
FIG. 5 is a schematic circuit diagram illustrating a "full-on sense" circuit which may be utilized for the corresponding portion of the circuit of the embodiment of FIG. 1.

FIG. 5 illustrates an exemplary circuit for use as the full-on sensing circuit 58 and the pull up circuit 56 of FIG. 1 is illustrated, together with op amp 24 and pull up resistor 55. The full-on sensing circuit 58 and pull-up circuit 56 comprise a PNP transistor 220 whose emitter receives a suitable positive supply voltage and whose collector feeds pull up resistor 55. The base of transistor 220 receives the output of op amp 24 via a pair of series-connected resistors 222 and 224. The junction of resistors 222 and 224 is joined to the emitter of pull up resistor 220 (and hence the same biasing voltage) by the parallel combination of a resistor 226 and an integrating capacitor 228.

Figure 6:
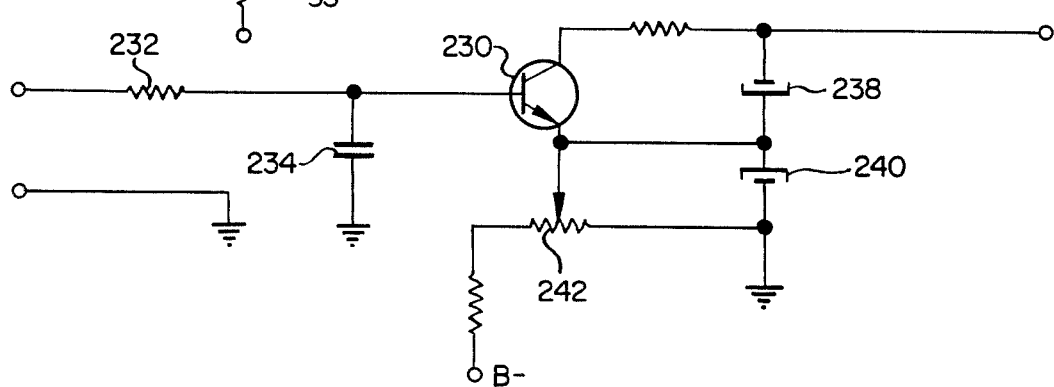
FIG. 6 is a schematic circuit diagram of an exemplary "peak sense" circuit which may be utilized for the corresponding portion of the circuit of the embodiment of FIG. 1.

FIG. 6 illustrates an exemplary circuit for use as the peak sensing circuit 30 of FIG. 1. An NPN transistor 230 receives at its base the running current signal from an input terminal 20 via a series connected resistor 232. A suitable noise filtering capacitor 234 is also provided at the base of transistor 230. The collector of transistor 230 provides the output signal of the circuit (which feeds the non-inverting input of op amp 24). This output is joined with the emitter of transistor 230 by a capacitor 238. Another capacitor 240 joins the emitter of transistor 230 with ground. A bias potentiometer 242 is connected between ground and a suitable negative voltage source and has its wiper arm joined with the emitter of transistor 230.

Figure 8:
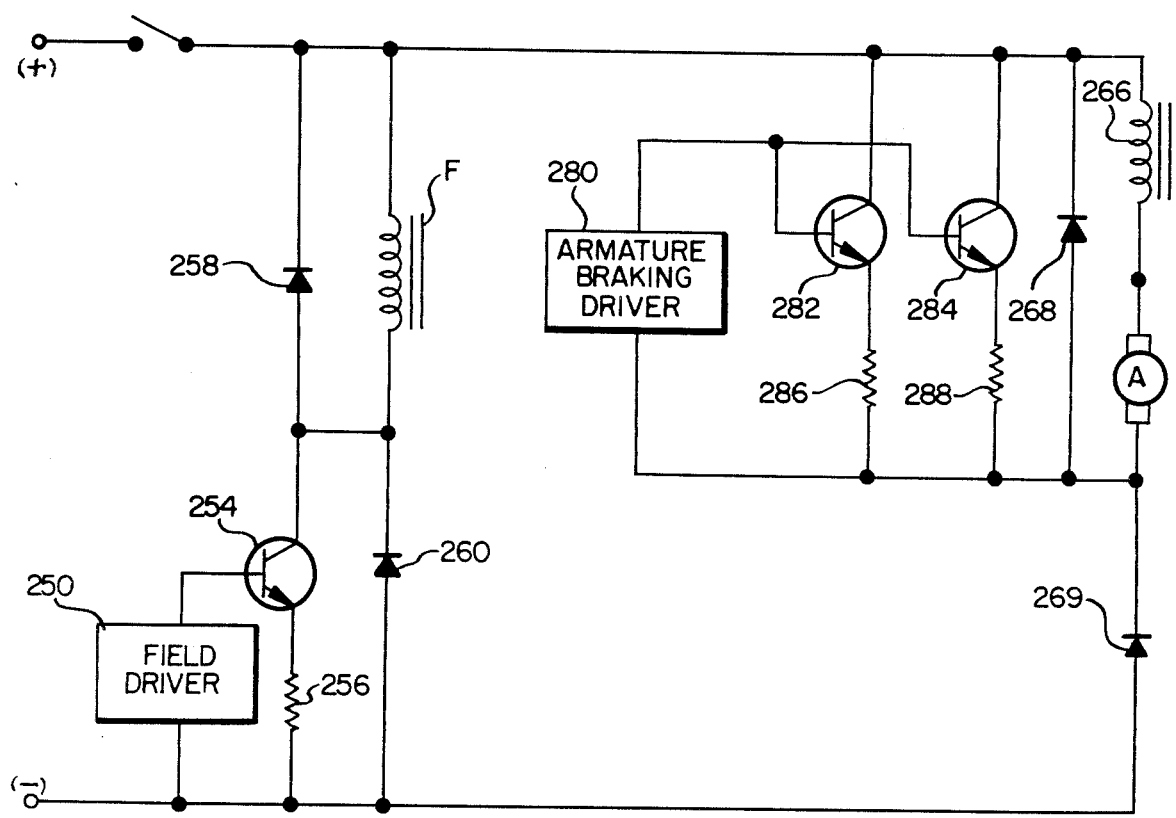
FIG. 8 is a schematic circuit diagram partially in block diagram form, illustrating an exemplary motor power controller for braking a DC motor.
Figure 9:
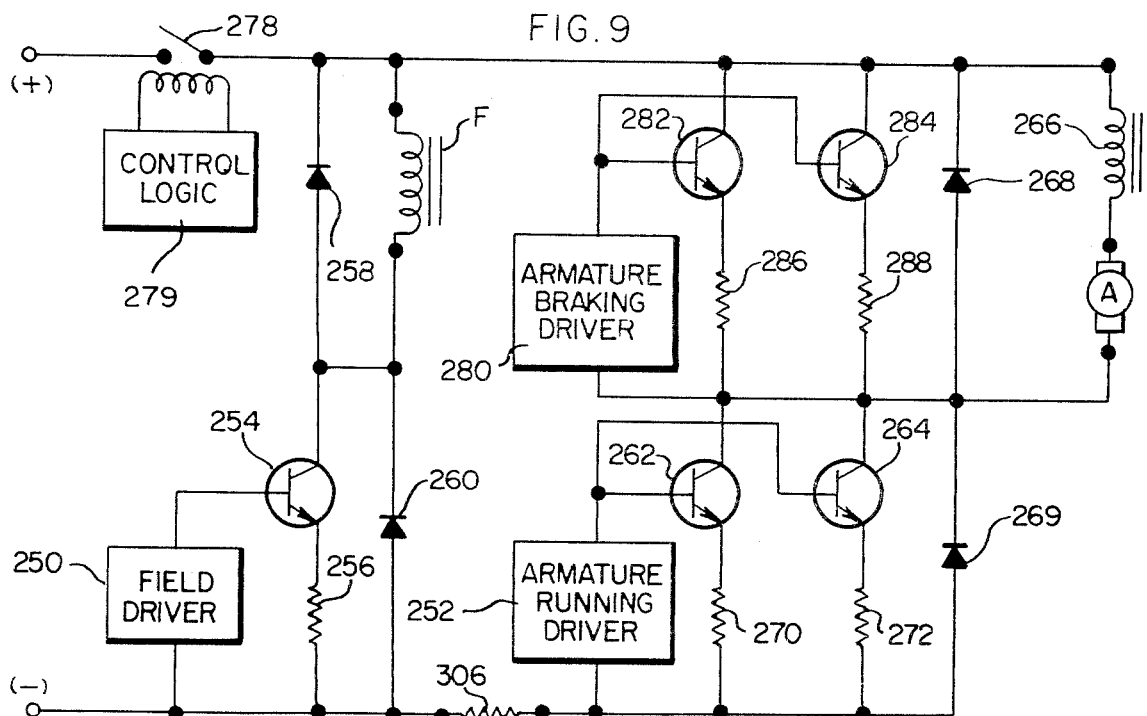
FIG. 9 is a schematic circuit diagram, partially in block diagram form of an exemplary motor power controller for both running and braking of a DC motor, and including a current amplifier.

FIGS. 7, 8 and 9 illustrate suitable motor power controller or driver circuits for supplying field and armature current for running and braking the DC motor of the illustrated embodiment, in response to the signals developed as described above with reference to FIGS. 1 and 2.

Reference is initially directed to FIG. 7, wherein there is illustrated a suitable motor power controller or driver circuit for running in accordance with the armature current multiplier or control logic circuit for running of FIG. 1. A pair of suitable driver circuits 250, 252 for the field and armature, respectively, are here illustrated in block form, a suitable such circuit being more fully shown in FIG. 10, as described hereinbelow. The field driver 250 drives the base of an NPN transistor 254 which has its collector and emitter joined in circuit for sinking current through the field coil F. Specifically, the collector is joined to one side of field coil F whose opposite side is joined with a positive bus. The emitter of transistor 254 is joined with a negative bus through a suitable series-connected resistor 256. A free wheeling diode 258 is paralleled with field coil F and a reverse shunt diode 260 is joined in series with field coil F and the negative bus.

Armature drive current 252 drives the bases of a pair of NPN transistors 262 and 264, whose collectors are joined in common to one side of the armature coil A. A free wheeling choke 266 is joined in series between the armature coil and the positive bus. A free wheeling diode 268 joins the collector electrodes of transistors 262 and 264 with the positive bus. A diode 269 is connected in parallel with the transistor 264 and its emitter resistor. The emitter of transistors 262 and 264 sink current from the armature A to the negative bus by way of respective series connected transistors 270 and 272. These emitters also feed the running current signal input terminal 20 of FIG. 1, via respective series connected resistors 274 and 276. The positive bus may also be controlled by a cut-out relay 278, driven by surveillance control logic 279 to control energization of the power circuit of FIG. 7.

Referring now to FIG. 8, a motor power controller or driver circuit for braking is illustrated. An armature braking driver circuit 280 and a field driver circuit 250, both of the type more fully illustrated and described below with reference to FIG. 10, feed suitable driver transistors for the armature A and field coil F, respectively. In similar fashion to FIG. 7, the field driver feeds the base of a single NPN transistor 254, which is joined at its collector with field coil F and at its emitter with a suitable resistor 256, for sinking current through field coil F from the positive bus to the negative bus. Free wheeling diode 258 is provided in parallel with field coil F, and shunt diode in series between field coil F and the negative bus.

Also in similar fashion to FIG. 7, armature braking driver 280 feeds the bases of a pair of NPN transistors 282 and 284. The transistors 282 and 284 have their collectors connected in common to the positive bus and their emitters joined by respective resistors 286 and 288 to one side of armature A and to the low side of the armature braking drive circuit 280. Diodes 268 and 269 are the same as those illustrated in FIG. 7.

Referring briefly to FIG. 9, the entire circuit of FIGS. 7 and 8 for both running and braking circuits are illustrated, with the like parts indicated by like reference numerals. An alternative arrangement for the two armature current feed terminals 20 and 120 of FIGS. 1 and 2, respectively, is illustrated in FIG. 9. Replacing resistors 274 and 276 is a circuit comprising an operational amplifier 300 which has its inverting input fed via a current limiting resistor 302 from the active negative bus and its non-inverting input fed via a current limiting resistor 304 from a point separated from the low side of armature running driver 252 by a current sensing (meter shunt) resistor 306. A pair of clamping diodes, generally designated 308, are joined on the opposite anode to cathode polarity across the inverting and non-inverting inputs of op amp 300. A suitable feedback resistor 310 is provided from the output to the inverting input of op amp 300. The output of op amp 300 is then alternatively utilized as the source of running current signal and/or braking current signal for FIGS. 1 and 2, thereby eliminating the need for the volt-to-millivolt networks from the accelerator or braking signal terminals 32 and 132, respectively, as mentioned above in the descriptions thereof.

Figure 10:
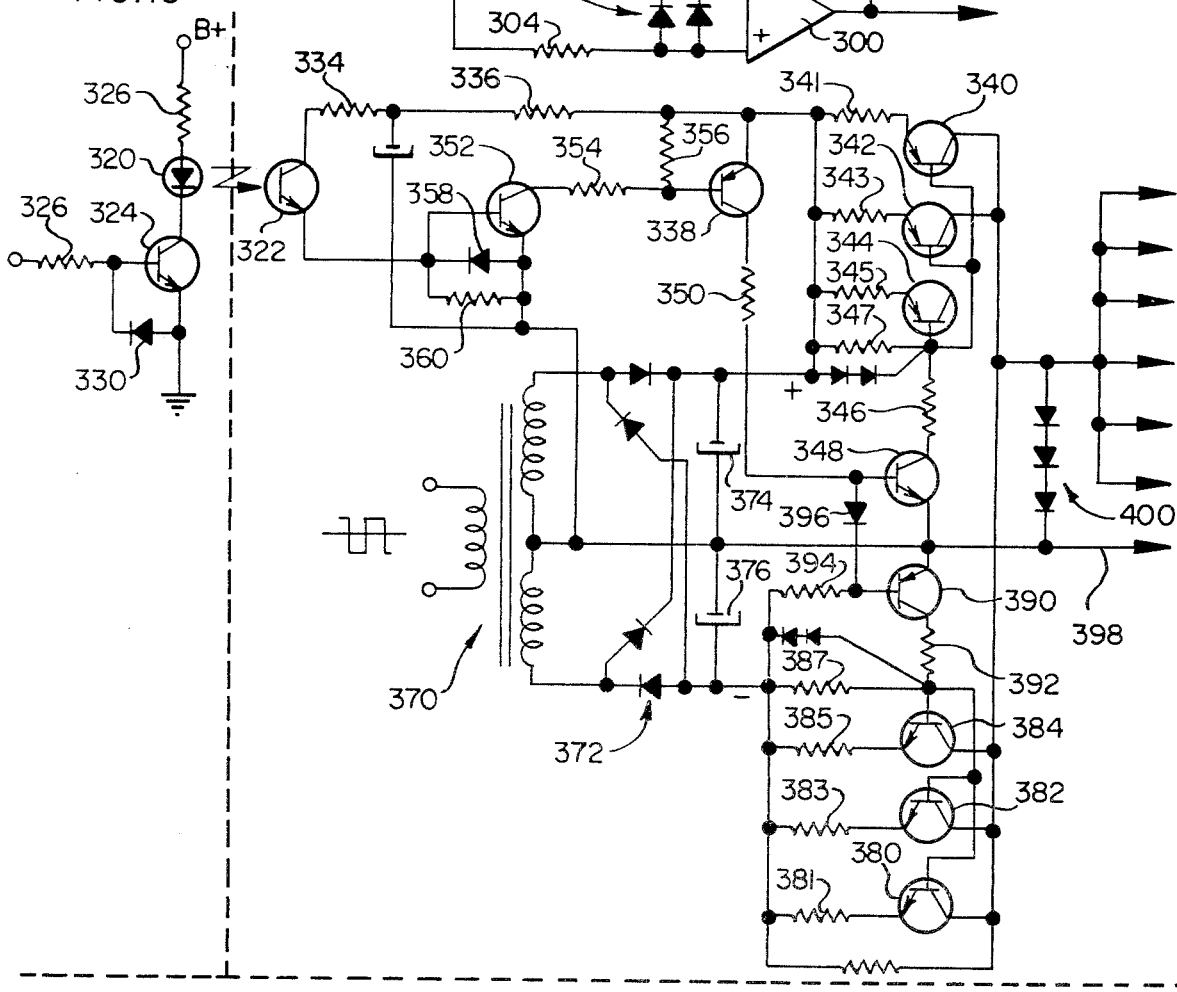
FIG. 10 is a schematic circuit diagram of an exemplary interface circuit useful in conjunction with the embodiment illustrated in the foregoing FIGS. 7, 8 and 9.

Referring now to FIG. 10, a suitable driver and interface circuit for use as the respective field drivers 250 and armature drivers 252 and 280, as illustrated. In general, the circuit shown in the embodiment of the invention illustrated here is a bipolar, current and voltage limited base drive circuit. The number of devices (e.g., 340, 390, etc.) used depends upon the amount of the load (e.g., the number of transistors used to drive the armature). In FIG. 10, a photocoupler interface comprising an LED 320 and photo-responsive transistor 322 provides an isolated input for the logic signal outputs of the circuits of FIG. 1 and FIG. 2. It will be understood that a separate such driver circuit and photocoupler arrangement is utilized for each of these logic outputs (the outputs of op amps 24 and 36 and of op amps 124 and 136, respectively). The respective logic output signals feed the base of an NPN transistor 324 through a current limiting resistor 326. Transistor 324 is employed as shown for sinking current through the LED 320.

The chopper driver circuit utilizes the pulse signals from the alternating conduction and non-conduction of photo-responsive transistor 322, in response to the respective logic signal received from the circuits of FIGS. 1 and 2. The collector of transistor 322 is joined via de-coupling circuit comprised of two series-connected resistors 334, 336 and a capacitor to the positive supply. The collectors of these three transistors 340, 342 and 344 are joined in common and form the output of the driver circuit to the bases of the respective driver transistors 254, 262, 264 and 282, 284 of FIGS. 7, 8 and 9. The bases of these three transistors 340, 342 and 344 are also joined in common via a resistor 346 to the collector of an NPN transistor 348. The base of transistor 348 is joined via a resistor 350 to the collector electrode of transistor 338.

Referring now to the emitter circuit of phototransistor 322, it will be seen that it feeds the base of an NPN transistor 352. Transistor 352 has its collector connected via a current limiting resistor 354 to the base of transistor 338, which point is also connected via a resistor 356 to the positive supply. The positive supply is fed to the emitters of transistors 340, 342 and 344 by resistors 341, 343 and 345, respectively. A base resistor 347 also runs from the positive supply to the common bases of transistors 340, 342 and 344. The emitter of transistor 352 is connected to the center tap between two secondary coils of a transformer 370.

Figure 15:
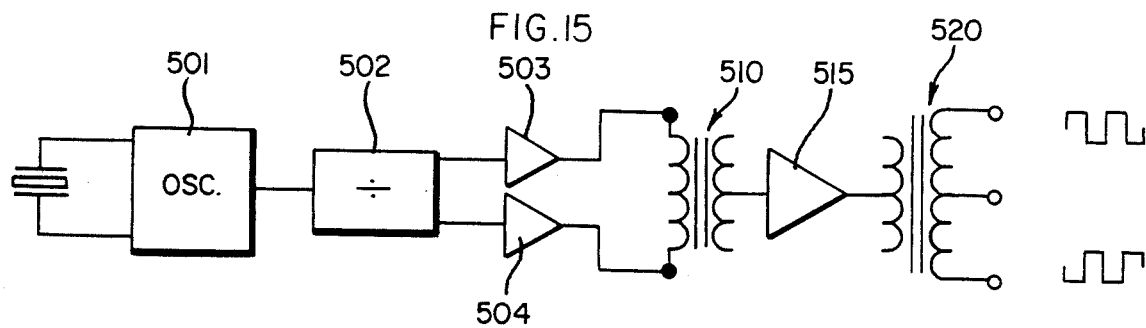
FIG. 15 is a schematic circuit diagram, partially in block diagram form, of a constant frequency inverter which may be employed advantageously for powering the base drivers, DC-DC converter, and control logic circuits of the present invention.

Transformer 370 has its primary fed from a suitable source of alternating current (e.g., from the output of the constant frequency inverter circuit illustrated in FIG. 15), its secondary driver a full-wave diode rectifier designated generally 372 and a pair of suitable filtering capacitors 374 and 376. The positive side of the rectifier circuit feeds the emitters of transistors 340, 342 and 344 through their respective resistors 341, 345 and also feeds their bases via resistor 347. To provide a bipolar base drive system that is current and voltage limited, a mirror image circuit is formed on the negative side of the rectifier circuit by NPN transistors 380, 382 and 384. These transistors sink current through to the negative side of rectifier 372 via respective series connected resistors 381, 383 and 385. Similarly, a resistor 387 is joined between the negative side of rectifier 372 and the bases of transistors 380, 382 and 384, which are connected in common. The collector electrodes of transistors 380, 382 and 384 also feed the output of the circuit. A PNP transistor 390 mirrors transistor 348 and has its collector electrode joined via a resistor 392 to the common bases of the transistors 380, 382 and 384. The base of transistor 392 is joined via a resistor 394 to the negative side of rectifier 372, while its emitter electrode is joined to the emitter electrode of transistor 348, a suitable diode 396 is joined between the base electrodes of transistors 348 and 390. A common emitter bus line 398 is provided from the emitters of transistors 348 and 390 to like transistors in the other chopper driver circuits illustrated in block form in FIGS. 7, 8 and 9. Three suitable series connected clamping diodes designated generally by reference numeral 400 join the output line with this common emitter bus 398.

Reference is next invited to FIGS. 11 and 12, which graphically illustrate features of the operation of the present invention as compared with prior art motor control arrangements.

FIG. 11 illustrates the control concept of the invention, specifically showing the curves for various values of the k coefficient, and a representation armature current versus field current. As the graph of FIG. 11 shows, the coefficient of field excitation ("K") varies from at least as low as 1/6 (0.167) to 4.

FIG. 12 generally mirrors the maximum and minimum k values illustrated in FIG. 11, which thereby show the general wide range of operation afforded by the motor control of the invention, as against typical curves of field current against armature current for series, shunt and compound-wound motors known in the prior art. The lines labeled 100A, 200A and 300A show different accelerator positions, in terms of the corresponding input current to these circuits of FIG. 1 and FIG. 2.

Table I is a chart which illustrates a controller response operation scheme in accordance with the invention. The chart shows the relative position of the accelerator pedal, both the amount of armature current and the mode (i.e., whether it is off, chopping, chopping and being multiplied, or full on), the battery current, the field current and its mode, and the k coefficient. All of these are shown as a function of the speed of the motor.

TABLE I

| | | Controller Response Operating Scheme | | |
| --- | --- | --- | --- | --- |
| | | Armature | | Batt. |
| Speed | Accelerator | Current | Mode | Curr. |
| Low 0~5 MPH | OFF | Off | Off | Off |
| | LOW | Low | Chop Multiply | Low |
| | MED | Med | Chop Multiply | Low |
| | HIGH | High | Chop Multiply | Med |
| Med 5~30 MPH | OFF | Off/ Low Neg. | Off/ Gen. | Off/ Neg. |
| | LOW | Low | Chop | Low |
| | MED | Med | Chop | Med |
| | HIGH | High | Full On | High |
| High 30 MPH and Above | OFF | Off/ Low Neg. | Off/ Gen. | Off/ Neg. |
| | LOW | Low | Chop | Off/ Low |

TABLE I-continued

| | | Controller Response Operating Scheme | | |
| --- | --- | --- | --- | --- |
| | MED | Med | Full On | Med |
| | HIGH | High | Full On | High |

| | Field | | ΔF/ΔA |
| --- | --- | --- | --- |
| Speed | Current | Mode | Coefficient |
| Low 0~5 MPH | Off | Off | -Na- |
| | Med | Chop | High positive |
| | High | Full On | Med Positive |
| | High | Full On | Positive |
| Med 5~30 MPH | Off/ Med | Off/ Chop | Positive |
| | Med | Chop | Positive |
| | Med | Chop | Unity |
| | Low | Chop | Neg |
| High 30 MPH and Above | Off/ Med | Off/ Chop | Positive |
| | Med | Chop | Positive |
| | Low | Chop | Neg. |
| | Very Low | Chop | Neg. |

Table II, which is similar to Table I, illustrates an operating scheme for utilizing the "super-series" invention in a generator application. One such application is a wind-driven electrical generator in which an alternator is driven by a rotor that is moved by the wind and, of course, no accelerator circuitry is required for most applications. Other such applications include: sailboat power conversion, solar cellpower systems, solar-thermal power systems, temperature gradient power generating systems and hydroelectric generating systems.

TABLE II

VOLTAGE REGULATOR FOR VARYING RPM GENERATOR
Operating Scheme
As An Example: W.E.C.S. 128 Charging Voltage

| Wind Speed MPH | Armature Current | Armature Mode | Current | Mode | Output Current Amps | Note: |
| --- | --- | --- | --- | --- | --- | --- |
| 0 | 0 | off | 0 | off | 0 | No power loss |
| 2 | 10 | shunt chop | 10 | full on | 0 | No available power |
| 4 | 20 | shunt chop | 10 | full on | 10 | Voltage multiplication |
| 6 | 30 | shunt chop | 10 | full on | 20 | Voltage multiplication |
| 8 | 40 | shunt chop | 10 | full on | 30 | Conventional unit |
| 10 | 50 | shunt chop | 10 | full on | 40 | Voltage multiplication |
| 15 | 75 | full on | 10 | full on | 65 | Direct connection |
| 20 | 100 | full on | 10 | full on | 90 | Direct connection |
| 25 | 125 | full on | 7 | chop | 119 | Med. field |
| 30 | 150 | full on | 5 | chop | 145 | Weak field |
| 35 | 175 | series chop | 5 | chop | 190 | Current multiplication |
| 40 | 200 | series chop | 5 | chop | 225 | Current multiplication |
| 45 | 225 | series chop | 5 | chop | 260 | Current multiplication |

Accordingly, the present invention is useful in the operation of DC machines, both motors and generators. In the case of motors, the invention greatly expands the power band of the motor while, also, and somewhat surprisingly, significantly increases the maximum power acceptance at relatively high speeds. In the case of a generator system, the efficiency in performance is significantly improved by application of the principles of the present invention. Such generator systems may take the form, for example, of an alternator, an outside motor type generator, or a permanent-magnet excited generator. In such a generating system, the basic operating principle remains analogous to that discussed for a DC motor, above, except, of course, that accelerator circuitry ordinarily is not employed. At low rpm, voltage multiplication is achieved by shunt chopping of the full field, such that the armature EMF is less than that of the standard DC system. At medium rpm an essentially direct feed achieves armature EMF substantially equal to the DC system, while at high rpm the current multiplication features of the invention are achieved by series chopping the normal field, such that armature EMF is greater than in the standard DC system. Advantageously, a generator system controlled in accordance with the present invention is able to supply power even when armature EMF is less than the conventional DC system. Moreover, a generator operated in accordance with the principles of the present invention is able to generate more than a conventional system by essentially changing or converting excess voltage potentials present in this system at various points in its operation into a useful current output.

Figure 14:
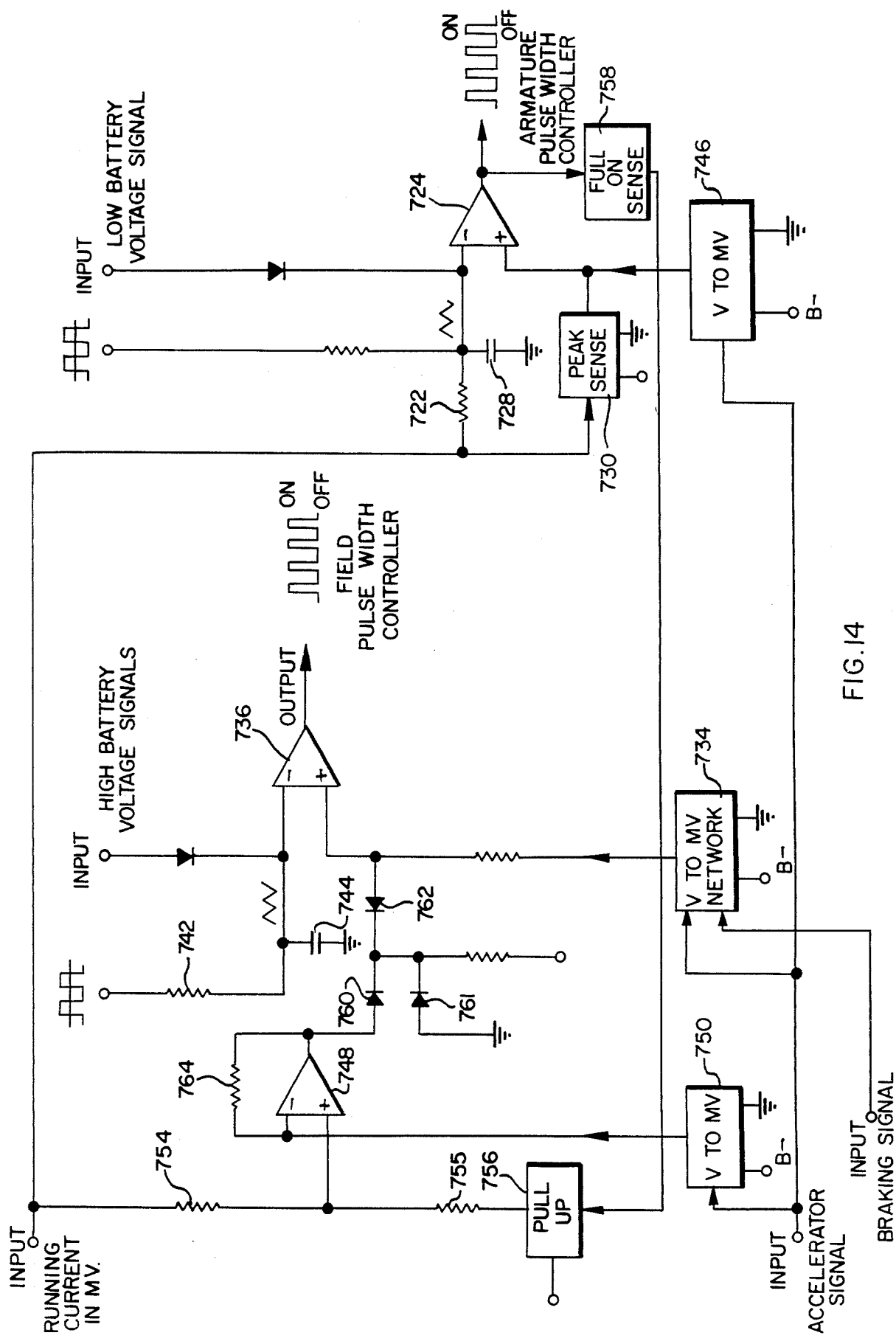
FIG. 14 is a schematic circuit diagram, partially in block diagram form, of an alternative embodiment of the present invention in which a simplified control logic circuit is employed for running and braking a DC motor.

With reference to FIG. 14, there is shown a schematic circuit diagram of an alternative motor control logic circuit for running and braking, which circuit is somewhat simplified relative to one previously described herein. The operation is similar to that of the embodiment illustrated in FIGS. 1 and 2.

The schematic circuit diagram of FIG. 15 illustrates a constant-frequency inverter that may be used with the present invention to obtain the square-wave signals used therein. A crystal-controlled oscillator 501 generates an oscillatory signal of a constant frequency, which signal in turn is divided by divider circuit 502 to obtain the desired frequency. A pair of op amps 503, 504 amplify the signals from divider 502 (same frequency but 180° phase difference) and drive a transformer 510. The output at the secondary winding of transformer 510 is applied to an amplifier 515 to substantially increase the power of the square-wave signal which is then applied to output transformer 520. Of course, conventional limiting circuitry may be included where desired in this circuit to change the signal waveform from sine wave to square. In addition, the number of amplification stages is determined typically by the output power level required for a given application.

Figure 16:
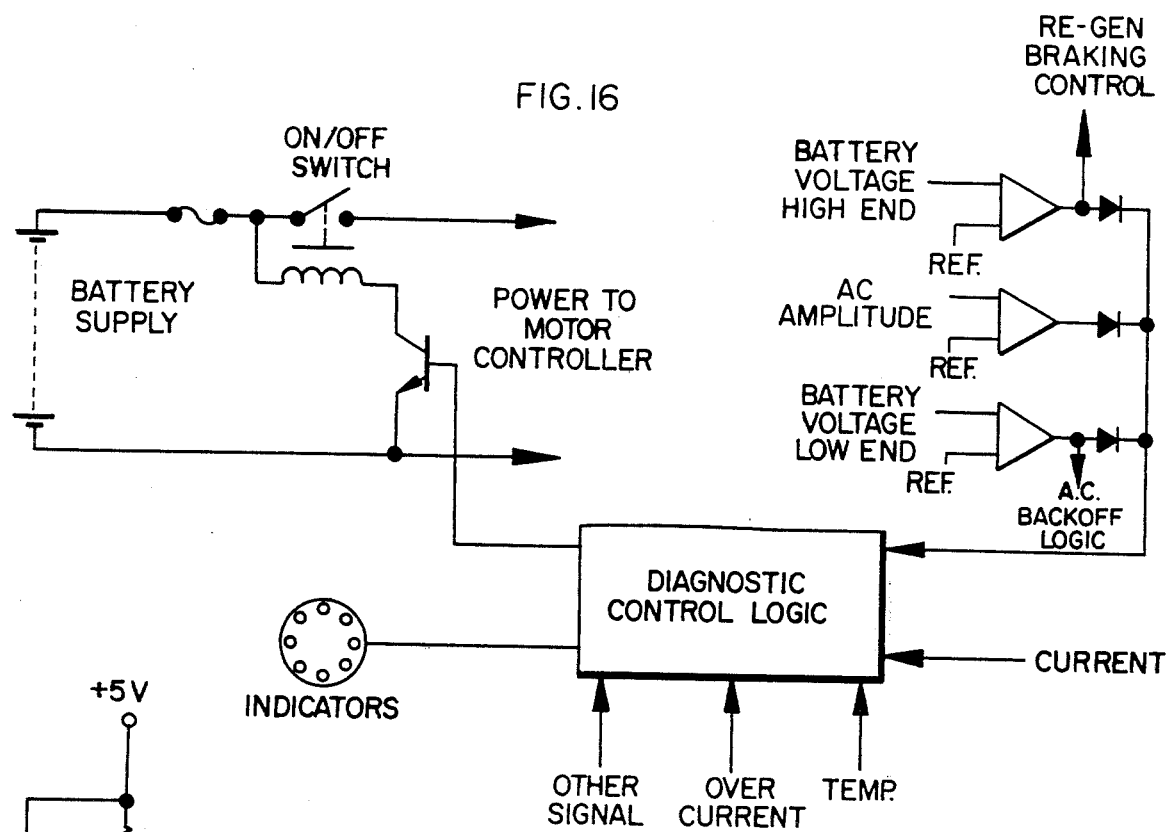
FIG. 16 is a schematic circuit diagram, partially in block diagram form, of a DC power supply and logic circuitry which may be employed advantageously in practicing the present invention.

With reference to FIG. 16, there is shown a schematic circuit diagram, partially in block diagram form, of some of the supporting logic circuitry for the illustrated embodiment of the present invention. The circuitry is self-explanatory and it provides signals for various logic inputs in the system as designated in the drawings.

Figure 17:
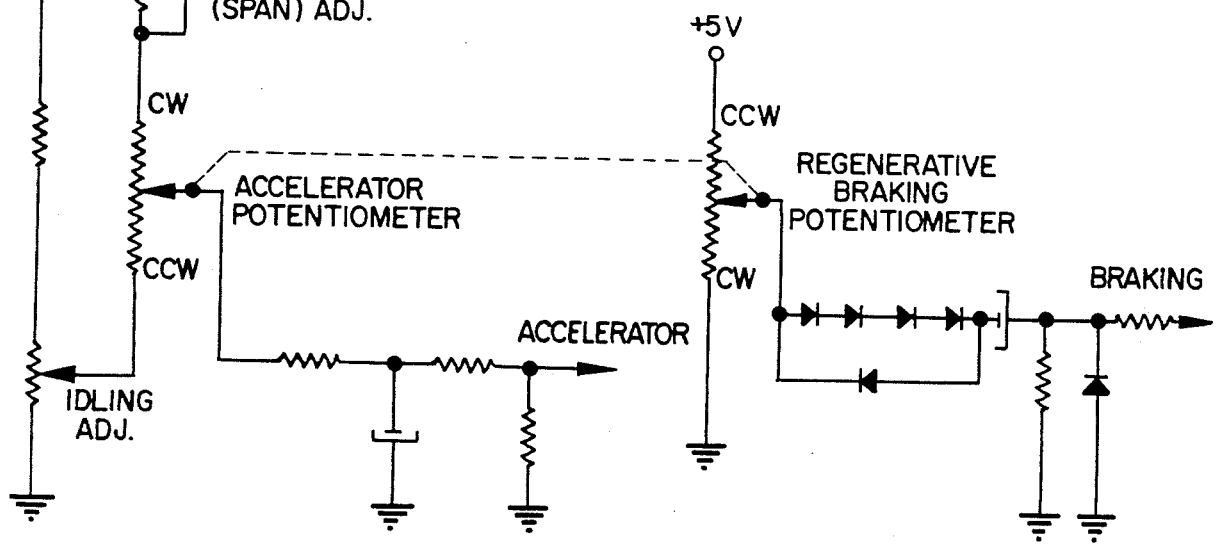
FIG. 17 is a schematic circuit diagram of a combined accelerator and regenerative braking control circuit that may be employed advantageously in supplying the demand and braking signals to the motor control logic circuitry of the present invention.

FIG. 17 illustrates a combined accelerator and regenerative braking control circuit that may be used as an alternative to the circuit previously described herein.

The performance adjustment is used to "fine tune" the system for various environmental factors in the field.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design and others being apparent only after study. As such, the scope of the invention should not be limited by the particular embodiments and specific construction described herein but should be defined by the appended claims, and equivalents thereof. Accordingly, the aim in the appended claims is to cover all such changes and modifications as fall within the true spirit and scope of the invention.

The invention is claimed as follows:

1. A control system for automatically controlling the coefficient of excitation in a DC machine having an armature winding and a field winding, said DC machine typically being operated under conditions wherein the demand varies from time to time, said control system operating independently of armature r.p.m. and armature voltage, said system comprising: generator means for generating a pulse signal having a predetermined frequency and pulse width; demand signal means for producing an electrical demand signal corresponding to the demand on said DC machine; armature current sensing means coupled to said armature winding for producing an electrical drive signal corresponding to the actual armature current in said DC machine independently of armature r.p.m. and armature voltage; pulse width sensing means coupled to said generator means for sensing the pulse width of said pulse signal and developing a corresponding pulse width signal; pull up circuit means coupled to said pulse width sensing means and responsive to said pulse width signal for generating a deactivating signal; control circuit means coupled to said generator means and to said pull-up circuit means and responsive to said demand signal, said deactivating signal and said drive signal for adjusting said pulse width of said pulse signal; and means, coupled between said control circuit means and said armature winding and said field winding, and responsive to said pulse signal, for applying signals to said armature winding and said field winding which vary in accordance with said adjusted pulse width throughout the entire operating range of said DC machine, whereby the coefficient of field excitation is varied in accordance with the corresponding demand and armature current to substantially increase the efficiency of the DC machine.

2. A control system according to claim 1, wherein said control circuit means comprises armature current multiplying means responsive to positive armature current for controlling the pulse width of the signals applied to the armature winding and to the field winding, respectively, and armature voltage multiplying means responsive to negative armature current for controlling the pulse width of the signals applied to the field winding and for controlling current in shunt of the armature winding, respectively.

3. A control system according to claim 1, wherein said control circuit means includes means for varying the coefficient of field excitation substantially between 0.1 and 4.0.

4. A control circuit according to claim 1, wherein said DC machine comprises a DC motor, wherein said means for sensing demand comprises means for producing a current signal corresponding to the relative position of an accelerator/braking control member, and wherein said control circuit means includes means for varying the coefficient of excitation so as to expand the power band of said DC motor and to increase the power acceptance of said DC motor at predetermined, relatively high speeds, in a predetermined fashion.

5. A control system according to claim 4 wherein said control circuit means include means for varying said coefficient of field excitation substantially in a range of between substantially 0.1 and 4.0.

6. A control system for automatically controlling the coefficient of field excitation in a DC motor having an armature winding and a field winding, said motor typically being operated under load conditions that vary from time to time, said control system operating independently of armature r.p.m. and armature voltage, said system comprising: generator means for generating a pulse signal having a predetermined frequency and pulse width; accelerator/braking current means for producing electrical demand signals corresponding to the desired speed of said motor; armature current sensing means coupled to said armature winding for producing an electrical drive signal corresponding to the actual armature current of said motor independently of armature r.p.m. and armature voltage; pulse width sensing means coupled to said generator means for sensing the pulse width of said pulse signal and developing a corresponding pulse width signal; pull up circuit means coupled to said pulse width sensing means and responsive to said pulse width signal for generating a deactivating signal; control circuit means coupled to said generator means and responsive to said demand signal, said deactivating signal and said drive signal for controlling the pulse width of said pulse signal; and means, coupled between said control circuit means and said armature winding and field winding, and responsive to said pulse signal for applying signals to said armature winding said field winding which vary in accordance with said adjusted pulse width throughout the entire operating range of said DC motor for controlling the armature current and field current so as to achieve a predetermined coefficient of field excitation for a given value of said demand signal and said drive signal.

7. A control system according to claim 6 wherein said control circuit means includes current multiplier means responsive to a positive value of said armature current and a positive value of said demand signal for producing both a controlled pulse width field current control signal and a controlled pulse width armature current control signal, and a voltage multiplier means responsive to a negative value of said armature current signal for producing a controlled pulse width signal for controlling field current and current in shunt of said armature, respectively, for braking said DC motor.

8. A control system according to claim 6 or claim 7, wherein said control circuit means include means for controllably varying said coefficient of field excitation substantially between 0.1 and 4.0.

9. A method for controlling a DC machine independently of armature r.p.m. and armature voltage, said DC machine having an armature winding and a field winding and typically being operated under demand conditions that vary from time to time, said method comprising the steps of: sensing the demand on said DC machine and producing a corresponding demand signal, sensing the armature current of the machine and producing a corresponding drive signal that is independent of armature r.p.m. and armature voltage, sensing the pulse width of said pulse signal and developing a corresponding pulse width signal, generating a deactivating signal in response to said pulse width signal, generating a pulse signal having predetermined frequency and pulse width which is variable in accordance with said demand signal, said deactivating signal and said drive signal throughout the entire operating range of said DC machine and further controlling the pulse width of said pulse signal means in accordance with a predetermined variable range of coefficient of field excitation, and applying said pulse signal to said field winding throughout the entire operating range of said DC machine, whereby the coefficient of field excitation is varied in accordance with the corresponding demand and armature current to substantially increase the power acceptance and therefore the efficiency of the DC machine.

10. A method according to claim 9 wherein said last mentioned controlling includes controlling said pulse width of said signal means in accordance with predetermined variations in the coefficient of field excitation in a range substantially between 0.1 and 4.0.

* * * * *